United States Patent [19]

Ehrsam

[11] Patent Number: 4,812,236
[45] Date of Patent: Mar. 14, 1989

[54] METAL MICROFILTER

[75] Inventor: Christian Ehrsam, Winterthur, Switzerland

[73] Assignee: Sulzer Brothers Limited, Winterthur, Switzerland

[21] Appl. No.: 109,222

[22] Filed: Oct. 16, 1987

[30] Foreign Application Priority Data

Oct. 23, 1986 [CH] Switzerland ............... 4226/86

[51] Int. Cl.⁴ .................................. B01D 25/00
[52] U.S. Cl. .................. 210/490; 210/500.25; 204/24; 428/613
[58] Field of Search ............ 210/500.25, 490; 264/22; 204/11, 15, 24; 428/596, 606, 613

[56]     References Cited
U.S. PATENT DOCUMENTS

| 2,271,662 | 2/1942 | Rubissow | 428/596 |
| 3,264,720 | 8/1966 | Mott | 428/596 |
| 4,042,466 | 8/1977 | Anselrode | 204/11 |
| 4,575,406 | 3/1986 | Slafer | 204/15 |

Primary Examiner—Richard V. Fisher
Assistant Examiner—Coreen Y. Lee
Attorney, Agent, or Firm—Kenyon & Kenyon

[57] ABSTRACT

A metal microfilter foil is provided with a supporting structure made up of two layers which are deposited on a rear side of the foil. The first layer comprises a plurality of connecting elements of column or web shape which widen at the top to form enlarged portions which merge together to form the second layer leaving open macropores. The continuous supporting structure provides large pores as compared with the micropores of the foil and offer considerable stability.

20 Claims, 4 Drawing Sheets

METAL MICROFILTER

This invention relates to a metal microfilter. More particularly, this invention relates to a supporting structure for a metal microfilter foil.

Microfilter foils have been known to be used as a suitable filter medium for transverse-current filtration and are frequently called surface filters or filtering screens. When used for transverse-current filtration, the foils provide for a continuous filtration process since no filter cake is deposited on the filter medium. Further, the pores of the microfilter foils can be made smaller than bacteria which have a cell size of at least 0.2 um. Consequently, continuous degerminating filtration is possible.

One process for manufacturing a microfilter foil is described in pending U.S. patent application Ser. No. 073,812 filed July 15, 1987 wherein use is made of a modified photolithographic process. As described, a laser is used to produce an interference pattern resulting in a layer of light-sensitive varnish having a grid-like surface structure. In two further steps of the process, for example cathode atomization and polishing, a thin metal skin is produced having regular perforations.

Generally, such foils can be made of gold or nickel or titanium or an alloy such as of gold and palladium. However, such microfilter foils are extrmmely sensitive structures and require a supporting structure before being placed on a filter support and inserted into a filtering apparatus. Further, the supporting structures should not reduce the permeability of the foils or otherwise block the micropores of the foils.

Accordingly, it is an object of the invention to provide a supporting structure for a microfilter foil which leaves a large area of the foil permeable but which is extremely stable.

It is another object of the invention to support a microfilter foil in a stable manner.

Briefly, the invention provides a filter comprised of a metal microfilter foil having micropores and an electroplated open-pore supporting structure supporting the foil and having pores of larger size than the micropores. In one embodiment, the supporting structure includes a first porous layer of individual connecting elements connected to the foil and a second porous layer connected to the connecting elements and having a continuous structure with open macropores.

The connecting elements of the first porous layer may be of column shape or of web shape or a combination of both.

Various processes may be carried out in order to construct the filter. However, in order to produce a galvanoplastic (electroplated) supporting structure, the structure is converted into an electrode (cathode).

In one embodiment, a microfilter foil can be constructed as described in co-pending patent application Ser. No. 073,812. In this regard, the microfilter foil is on a substrate, e.g. a glass plate, with photosensitive resist between the glass plate and the foil. A layer of conductive varnish containing finely divided metal particles can then be deposited on the surface of the microfilter foil. After being thus reinforced with conductive varnish, the microfilter foil can be removed from the glass pate by diffusing a selective solvent through the porous layer of conductive varnish, so as to dissolve the photosensitive varnish but not the conductive varnish. One such selective solvent is the developer solution of the photosensitive resist.

After the photosensitive varnish dissolves, the microfilter foil can be transferred to a metal galvanic (conductive) substrate, which is placed on the microfilter foil while still on the glass plate. The glass plate is pulled off in the longitudinal direction, whereupon the exposed rear side of the microfilter foil, which is now on top abuts the galvanic substrate.

The microfilter foil can then be drawn and fixed to the galvanic substrate by negative pressure, so that the foil lies smoothly on the surface of the galvanic substrate.

The exposed surface of the microfilter foil can then be coated with photosensitive varnish to form a first layer of the supporting structure.

The coating of varnish leaves areas uncovered, so that during electroplating they can form contact locations for growing the first layer on the microfilter foil.

The pattern of contact locations can be produced by using a correspondingly prepared mask. The mask can be a glass plate having parts of its surface covered with a layer impermeable to light, e.g. a chromium layer.

After illumination, the plate is developed in known manner and the photosensitive resist dissolves at the illuminated places, which correspond to the contact locations.

A galvanoplastic process can now begin, using e.g. gold as the coating material. The material is deposited at the contact locations and, depending on the duration of coating, forms raised portions which can extend somewhat above the contours of the contact locations.

If the first and second layer are produced in a one-step process, the coating time is made long enough for neighboring raised portions to coalesce and form a flat continuous structure. However, the galvanic coating process must be stopped at a stage when porelike openings still remain between the raised portions; these pores in the supporting structure must be considerably larger than the micropores in the microfilter foil.

The contact locations which do not cover more than 20% of the microfilter foil, can be isolated spots or continuous webs. A contact pattern consisting of spots can give a more porous supporting structure than a pattern of webs or a network, but a net gives greater tensile strength. A combination of the two embodiments is therefore particularly advantageous.

In another advantageous method of manufacture, the first and second layers are produced in two steps.

The first step is produced by the method described previously. A metal, e.g. gold, is then vapor-deposited on the first layer, thus making the whole surface electrically conductive. A second coating of varnish is then applied, followed by illumination through a mask and development, thus exposing the areas on which the second layer is to be deposited. The areas for subsequently forming the macropores remain covered by a layer of photosensitive resist. The second layer can then be produced by electroplating. Advantageously, the layer is of gold and forms contacts to which a bearing structure can finally be secured by diffusion welding.

These and other objects and advantages of the invention will become more apparent from the following detailed description taken in conjunction with the accompanying drawings wherein:

FIG. 4b illustrates a view taken on line 4b—4b of FIG. 4a;

FIG. 5b illustrates a cross sectional view taken on line 5b—5b of FIG. 5a;

FIG. 6b illustrates a plan view of a first layer of the two-layer supporting structure of FIG. 6a.

Figure 1A:
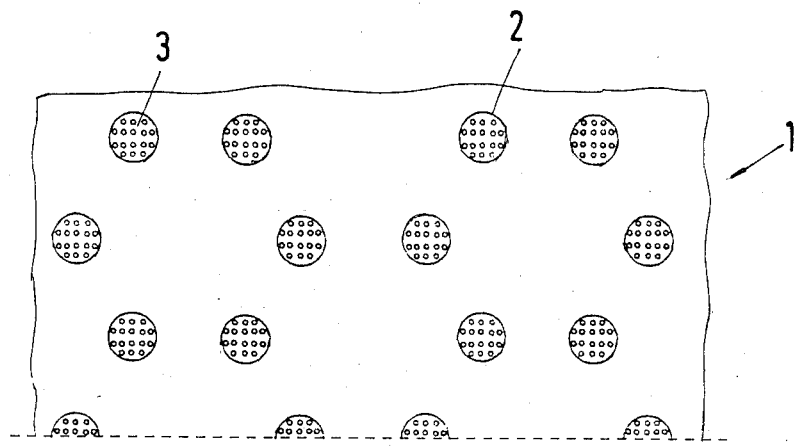
FIG. 1a illustrates a plan view of a microfilter foil covered with illuminated photosensitive resist after development.
Figure 1B:
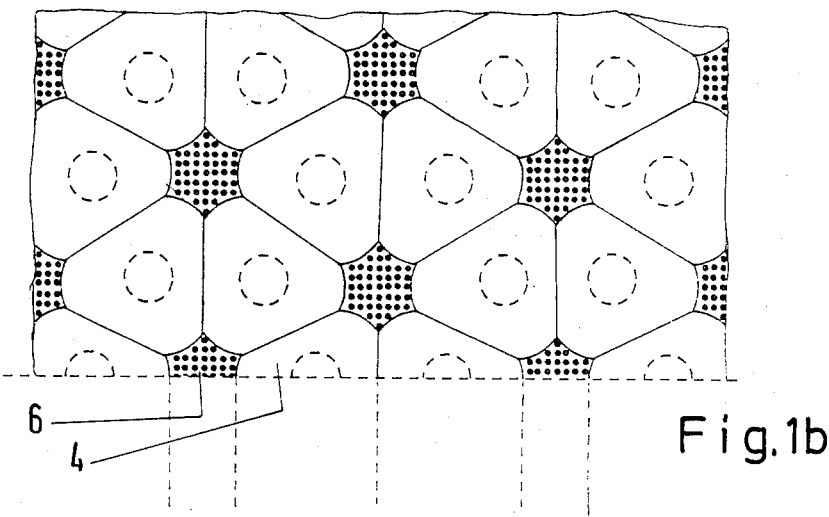
FIG. 1b illustrates the microfilter foil after a two-layer supporting structure has been produced in accordance with the invention.
Figure 1C:
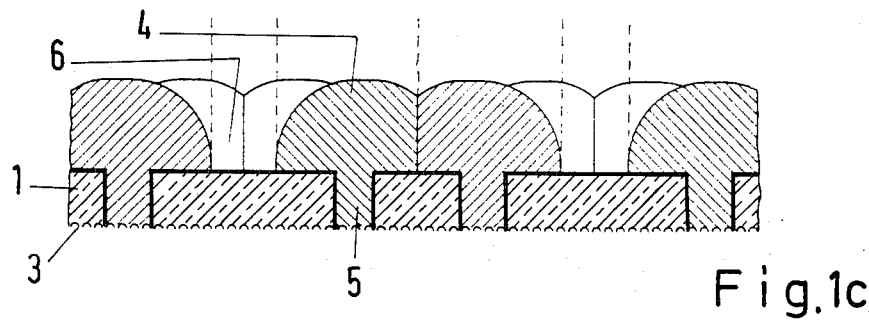
FIG. 1c illustrates a microfilter foil and the two-layer supporting structure in cross-section.

Referring to FIGS. 1a to 1c, in order to form a supporting structure for a metal microfilter foil in a single step process, a layer of photosensitive resist 1 having circular contact locations 2 is disposed above a metal microfilter foil 3 after illumination through a mask. As indicated in FIG. 1, the contact locations 2 are disposed in hexagonal patterns. After galvanoplastic coating for a suitable time, mushroom-like individual enlarged portions 4 form on column shaped connecting elements 5 above and in the immediate neighborhood of the contact locations 2. As indicated in FIGS. 1b and 1c, the column like connecting elements 5 are disposed in one layer relative to the foil 3 while the enlarged portions 4 define a second layer spaced from the foil 3. In addition, the enlarged portions 4 define a continuous structure with open macropores 6.

After the layers of the supporting structure have been finished, the layer of photosensitive resist can be dissolved in a conventional manner. The resulting structure provides a filter which can be mounted on a suitable bearing structure via the macroporous layer.

Figure 2:
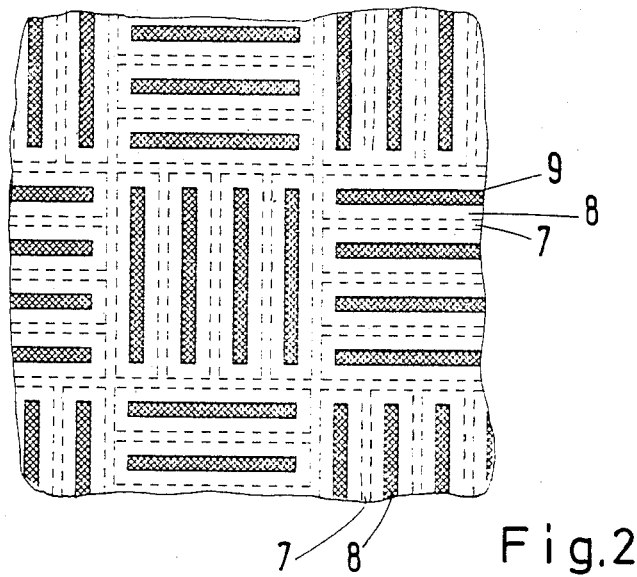
FIG. 2 illustrates a plan view of a modified supporting structure in accordance with the invention.

Referring to FIG. 2, the supporting structure for the microfilter foil can be constructed so that the connecting elements are of web shape. As indicated, the connecting elements of the first layer which is connected to the foil is formed of a plurality of contact webs or strips 7 which define a network pattern. The second porous layer is formed by web-like raised portions 8 which extend laterally from the contours of the webs 7. These raised portions 8 are formed at the end of a galvanoplastic process. As indicated, the raised or enlarged portions 8 define pores 9 therebetween. The pores 9 are also arranged in a parquet-like pattern over the supporting structure.

Figure 3:
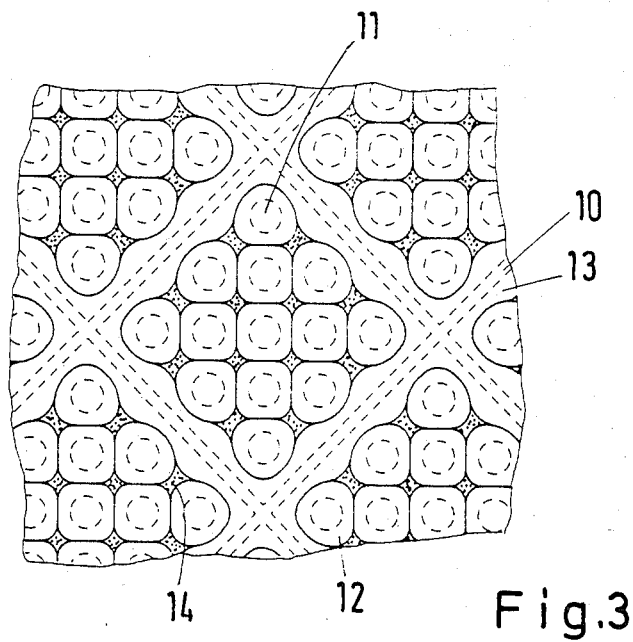
FIG. 3 illustrates a plan view of a modified supporting structure employing connecting elements of column shape and of web shape.

Referring to FIG. 3, the supporting structure can be formed of a network of web-shaped contacting elements 10 and column shaped contacting elements 11. As indicated, the web shaped elements 10 are arranged in a grid-like pattern and the column shaped connecting elements 11 are disposed within the grid. During galvanoplastic formation, enlarged portions 12 are formed on the column shaped connecting elements 11 and become continuous with each other while web-like raised portions 13 are formed on the web shaped connecting elements 10 and merge together with the enlarged portions 12 to define a continuous structure with open macropores 14.

Figure 4A:
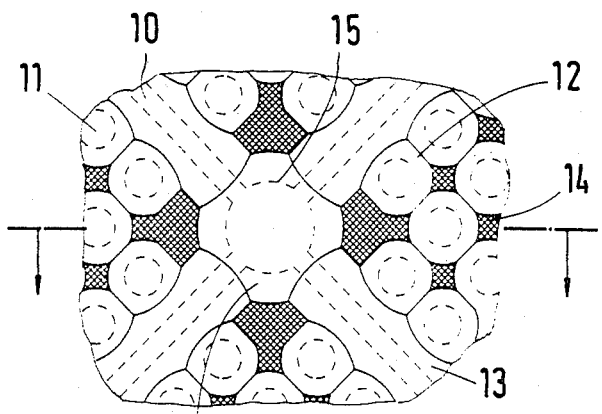
FIG. 4a illustrates a plan view of a further embodiment having a network of column shaped connecting elements and web shaped connecting elements.
Figure 4B:
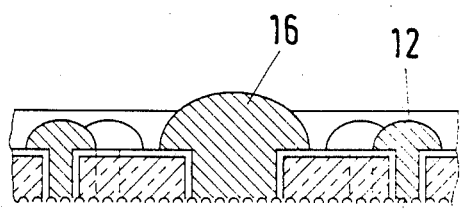

Referring to FIGS. 4a and 4b, wherein like reference characters indicate like parts as above, column shaped connecting elements 15 are provided at the junctions of the web shaped connecting elements 10 and are provided with enlarged end portions 16 which are larger than and which project over the remaining end portions 12, 13 as indicated in FIG. 4b.

In this embodiment, the two-layer supporting structure can be connected to a bearing structure (not shown) by diffusion welding at the raised portions 16.

Figure 5A:
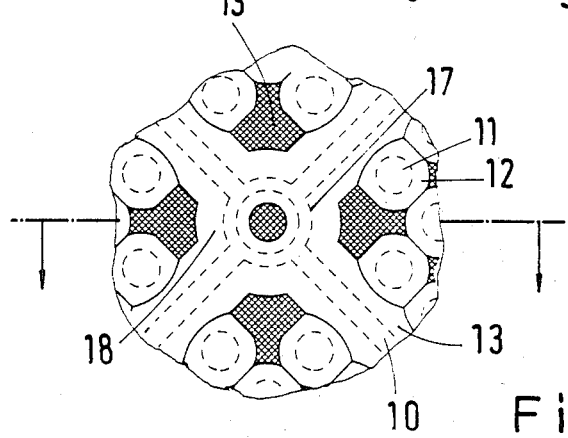
FIG. 5a illustrates a plan view of a further modified grid arrangement of connecting elements in accordance with the invention.
Figure 5B:
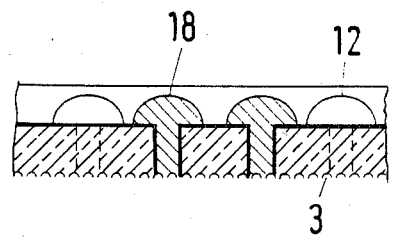

Referring to FIGS. 5a and 5b, wherein like reference characters indicate like parts as above, the junctions of the web shaped connecting elements 10 may be provided with annular connecting elements which provide enlarged end portions 18 of toroidal shape. This enables the supporting structure to be secured to a filter substrate (not shown) by soldering. In this case, the solder can be applied in paste form to the junctions by a silk screen process. During the soldering process, the solder melts and is trapped inside the torus defined by the end portions 18. This prevents the micropores in the microfilter foil from being stopped up by a flow of solder around the soldering junctions.

Figure 6A:
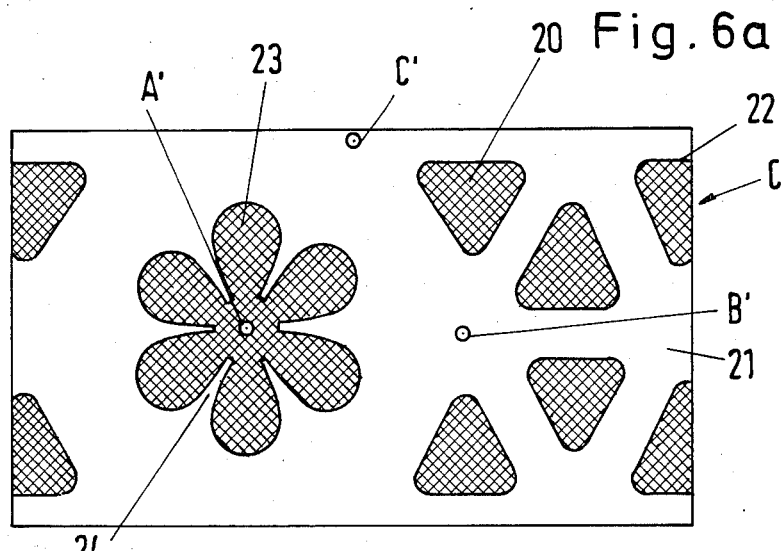
FIG. 6a illustrates a plan view of a modified top layer of a two-layer supporting structure in accordance with the invention.
Figure 6B:
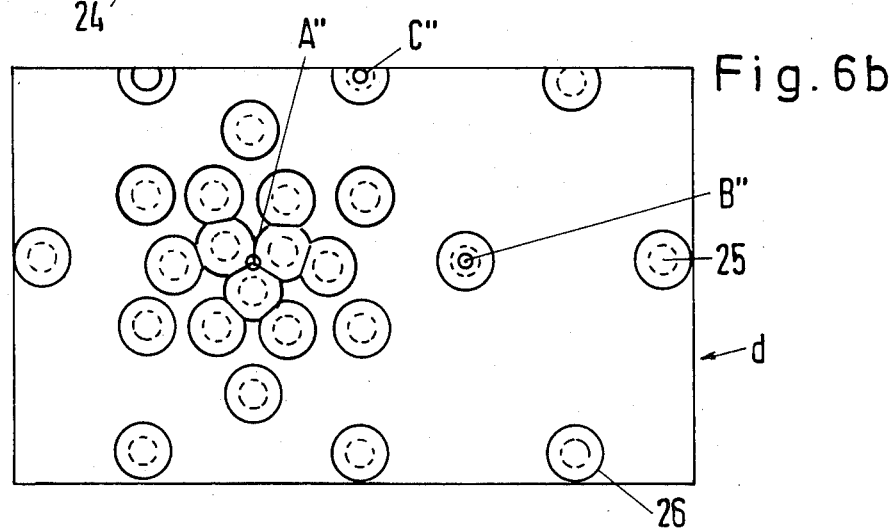
Figure 6C:
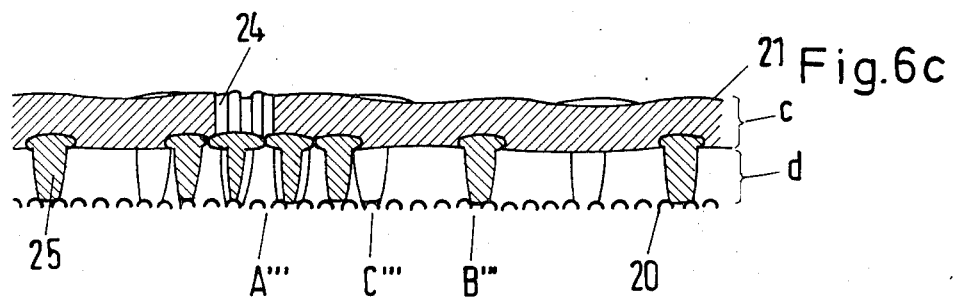
FIG. 6c illustrates a cross sectional view of the filter employing the two-layer of FIGS. 6a and 6b.

Referring to FIGS. 6a to 6c, a supporting structure may also be made in a two-step process.

As indicated in FIG. 6c, a metal microfilter foil 20 is provided with a supporting structure of two layers c, d.

Referring to FIG. 6a, the top layer c is shaped by using a suitably patterned mask. As indicated, a metal layer 21 is provided with macropores 22 above the microfoil 20. These macropores 22 for the filtrate can be relatively large irrespective of the nature of the bottom layer d. This is advantageous since less material is required than in the embodiments illustrates above, for example if an expensive metal such as gold is used.

As shown, contact locations 23 are provided in the metal layer c for securing a bearing structure (not shown). In addition, the bearing structure may be provided with pointed raised portions which are disposed to correspond exactly with the contact locations 23. This layer may also be connected to a bearing structure by diffusion welding.

In the illustrated embodiment, the contact locations 23 are disposed in rosettes leaving narrow metal webs 24 between the rosette leaves which extend towards a center of a respective contact location 23. The advantage of this embodiment is that the high pressure necessary during diffusion welding can be produced by relatively small forces due to the small area of contact between the webs 24 and the tips of the bearing structure. Another advantage is that the tips of the bearing structure need not have exactly the same height since differences in height between the tips can be compensated by correspondingly deforming the webs 24.

In order to match the pattern of the top layer c, a corresponding masked pattern is used for producing the bottom layer d. This layer d is so formed that column shaped connecting elements 25 are formed which thicken into a slightly enlarged portion 26. As indicated in FIG. 6b, the connecting elements 25 are more closely spaced at the contact locations 23 than at the remainder of the top layer c.

In order to clarify the understanding of the illustrated structure, superimposed positions in FIGS. 6a to 6c are marked A'-A'''; B'-B''' and C'-C'''.

Of note, in the embodiments illustrated in FIGS. 6a through 6c the second layer is separately deposited on the first layer and forms a seamless transverse connection between the respective ends of the connecting elements.

The invention thus provides a supporting structure for a metal microfilter foil which imparts stability to the foil.

Further, the invention provides a filter which can be readily incorporated into a filter support for a filtering device.

What is claimed is:

1. A filter comprising
a metal microfilter foil having micropores therein; and
an electroplated open-pore supporting structure supporting said foil and having pores of larger size than said micropores, said supporting structure including a first porous layer of individual connecting elements connected to said foil and a second porous layer connected to said elements of said first layer and having a continuous structure with open macropores.

2. A filter as set forth in claim 1 wherein said connecting elements are of column shape.

3. A filter as set forth in claim 1 wherein said connecting elements are of web shape.

4. A filter as set forth in claim 1 wherein said connecting elements have enlarged end portions merging together to define said second layer with said macropores.

5. A filter as set forth in claim 1 wherein said second layer is separately deposited on said first layer and forms a seamless transverse connection between respective ends of said connecting elements.

6. A filter as set forth in claim 5 wherein said second layer has a plurality of contact locations for receiving a bearing structure.

7. A filter as set forth in claim 6 wherein said connecting elements are more closely spaced at said contact locations than at the remainder of said second layer.

8. A filter as set forth in claim 6 wherein said second layer has narrow webs near said contact locations and extending towards a center of a respective contact location.

9. A filter as set forth in claim 1 wherein said connecting elements are disposed in a grid.

10. A filter as set forth in claim 1 wherein said connecting elements include a network of web-shaped elements and column-shaped elements defining a mesh like net.

11. A filter as set forth in claim 10 wherein said connecting elements have enlarged end portions merging together to define said second layer with said macropores, said end portions at junctions of said net are larger than and project over the remaining end portions.

12. A filter as set forth in claim 10 wherein said end portions at junctions of said net are of toroidal shape.

13. A filter comprising
a metal microfilter foil having micropores therein; and
an electroplated open-pore supporting structure supporting said foil and having pores of larger size than said micropores, said supporting structure including a plurality of connecting elements connected to said foil and a plurality of enlarged end portions connected to respective ends of said connecting elements and defining macropores therebetween.

14. A filter as set forth in claim 13 wherein said connecting elements are of column shape.

15. A filter as set forth in claim 13 wherein said connecting elements include a plurality of web-shaped elements defining a grid and a plurality of columnshaped elements within said grid.

16. A filter as set forth in claim 15 wherein said connecting elements include column-shaped elements at junctions of said web-shaped elements and said enlarged portions at said junctions project over the remaining enlarged portions.

17. A filter as set forth in claim 15 wherein said connecting elements include column-shaped elements at junctions of said web-shaped elements with enlarged portions thereon of toroidal shape.

18. A filter as set forth in claim 13 wherein said connecting elements are of web-shape.

19. A filter as set forth in claim 18 wherein said enlarged end portions define rectangular macropores therebetween to define a parquet arrangement.

20. A filter comprising
a metal microfilter foil having micropores therein;
a first layer of electroplated spaced apart connecting elements connected to said foil; and
a second layer of metal connected to said first layer in spaced relation to said foil and having a pattern of macropores therein.

* * * * *